United States Patent [19]

Schlechta

[11] Patent Number: 5,224,391

[45] Date of Patent: Jul. 6, 1993

[54] DEVICE FOR CONNECTING TWO GEAR ELEMENTS

[75] Inventor: Horst Schlechta, Redwitz, Fed. Rep. of Germany

[73] Assignee: Brose Fahrzeugteile GmbH & Co. KG, Coburg, Fed. Rep. of Germany

[21] Appl. No.: 689,973

[22] Filed: Apr. 23, 1991

[30] Foreign Application Priority Data

Aug. 23, 1989 [DE] Fed. Rep. of Germany ....... 3927738
Aug. 21, 1990 [WO] PCT Int'l Appl. ................. PCT/DE90/00635

[51] Int. Cl.⁵ ............................................. F16H 55/26
[52] U.S. Cl. ..................... 74/89.18; 49/342; 74/409; 74/411; 74/422; 74/461; 248/429; 297/344
[58] Field of Search ................. 74/89.17, 89.18, 89.19, 74/422, 409, 411, 461; 49/342; 248/429; 297/344

[56] References Cited

U.S. PATENT DOCUMENTS

| | | | |
|---|---|---|---|
| 2,161,366 | 6/1939 | McGregor | 297/344 |
| 2,591,338 | 4/1952 | Cooper | 74/422 X |
| 2,985,028 | 5/1961 | Napolin et al. | 74/411 X |
| 3,505,895 | 4/1970 | Ravenel | 74/422 |
| 4,066,356 | 1/1978 | Parker | 74/422 X |
| 4,141,583 | 2/1979 | Kluting et al. | 297/344 |
| 4,257,286 | 3/1981 | Ohyama | 74/422 |
| 4,495,827 | 1/1985 | Parizet | 74/89.18 |
| 4,621,784 | 11/1986 | Kaesling et al. | 297/344 X |
| 4,842,232 | 6/1989 | Pipon et al. | 297/344 X |

FOREIGN PATENT DOCUMENTS

| | | | |
|---|---|---|---|
| 0024976 | 3/1981 | European Pat. Off. | |
| 0130275 | 1/1985 | European Pat. Off. | |
| 3501422 | 7/1986 | Fed. Rep. of Germany | |
| 1109627 | 9/1955 | France | 74/461 |
| 1524207 | 5/1968 | France | |
| 583953 | 1/1947 | United Kingdom | 74/422 |

Primary Examiner—Allan D. Herrmann
Attorney, Agent, or Firm—Fish & Richardson

[57] ABSTRACT

Device for connecting two drive elements 2 and 3 whose engagement flanks 20, 30 opposite one another are rollable positively on one another, with one drive element 3 being connected with at least one support surface 4 with a base 1 whose total length is less than the length of the drive element 3. Drive element 3 forms a curved spring path which passes through the (at least one) support surface 4 and directs engagement flank 30 of one drive element 3 toward engagement flank 20 of the other drive element 2.

15 Claims, 4 Drawing Sheets

DEVICE FOR CONNECTING TWO GEAR ELEMENTS

The invention relates to a device for connecting two drive elements.

In order to maintain drive or articulation elements of an adjusting mechanism, which are rotationally or translationally movable with respect to one another, constantly in zero-play engagement with one another, the prior art teaches connecting the engaging flanks of the articulation or drive elements facing one another by means of a spring, for example a coil or rubber spring.

Thus for example in a device for adjusting a vehicle seat lengthwise, the rack required for the purpose is mounted on a sprung rubber base with a lower rail connected to the vehicle floor so that the tooth flanks of the rack are pressed against the pinion engaging the rack for lengthwise adjustment of the vehicle seat to reduce the play between the teeth as they mesh with one another. This rubber mount for the rack however makes necessary a complex installation in which the rack must be held down against the action of the rubber spring by means of a special device in order to ensure engagement with the pinion. It is also necessary to mount the pinion in a sliding block, which entails considerable difficulty and makes special tools necessary.

EP 0 024 976 B1 teaches an articulated bracket for connecting the seat part with the back of a seat, said bracket having a fixed flange with a circular recess and a movable flange, provided with a collar with internal teeth, said collar being inserted in the recess in the fixed flange. A pivotable locking pawl is provided between the flanges, said pawl engaging the toothed collar. A cam is provided movably between a locking position of the articulation, in which it keeps the teeth engaged with the toothed collar and a position in which it releases the teeth.

In order to ensure constant engagement of the locking pawl in the internally toothed collar in the locking position, a coil spring is provided between the fixed and movable flanges.

This known locking device consists of a plurality of individual parts for adjusting a desired inclination of the seat back and requires a considerable amount of space because of the significant mounting depth/height of the coil spring. The assembly of the many individual parts requires considerable time and generates high assembly costs in addition to the high costs of the individual parts. In addition, the lifetime of an articulated bracket of this kind and its functional reliability are limited since many parts subject to wear are provided.

Another problem in connecting two transmission parts in seat adjusting devices or electric window lifters consists in the fact that without additional measures, with a sloping seat installation position or when using heavy windows made of bullet-proof glass, there is the danger that the pinion will "override" the rack in a seat adjusting device or the segmental window lifter arm, causing a chattering effect which, in addition to producing disturbing vibrations, results in a considerable decrease in the lifetime of the adjusting device because of a high degree of wear of the drive parts moved with respect to one another.

The goal of the present invention is to provide a device for connecting two transmission elements of the species recited at the outset which ensures a minimum play between the drive parts and hence [ensures] maximum functional reliability, produces a short assembly time and low assembly costs, and which is characterized by a minimum space requirement and a long lifetime because of minimum wear.

The solution according to the invention effectively reduces the play between the drive elements which are movable with respect to one another and thereby ensures high functional reliability with minimum space requirements. Since both drive elements are kept constantly in mesh, chattering effects which occur when the moved drive element is connected with a considerable weight and gravity acts on the drive element, are effectively suppressed. As a result, additional devices for braking the moved drive element may be eliminated.

In addition, the device according to the invention is readily installable, since no additional mounting devices are necessary, so that low installation costs are incurred in addition to the effect of reduced assembly time.

One advantageous improvement on the solution according to the invention is characterized by the fact that one drive element with a support surface is connected to the base and describes a curved spring path around a midpoint located above the support surface on the side of the other drive element or by the fact that one drive element with two contact surfaces is connected to the base and describes a curved spring path around a midpoint which is located below the support surfaces on the side opposite the other drive element.

The concavely or convexly curved spring path keeps both drive elements constantly engaged and simultaneously makes possible, at the support surfaces, a simple connection between the two drive elements without additional devices being required for assembly which increase assembly costs and require considerable assembly time.

One advantageous design of the solution according to the invention for an adjusting device for a motor vehicle seat with respect to a vehicle floor, which is connected to a rack, in which a pinion movable over the length of the rack engages, is characterized by the fact that the rack is made sprung lengthwise and supported on the vehicle floor by a support surface which is smaller than the length of the rack so that the rack forms a curved spring path which passes through the support surface and whose midpoint is located on the side of the rack on which the pinion engaging the rack is disposed.

The solution according to the invention provides a connecting device in which the curved spring path of the rack keeps the moving pinion constantly engaged. In this way, the curved spring path prevents overriding of the pinion or of the rack with the resultant chattering phenomena when the seat is inclined. Installation of the locking device is very simple and can be accomplished in a very short time without the need for special mounting tools.

One advantageous improvement on this solution according to the invention is characterized by the fact that the support surface is located between the ends of the rack, with the length of the support surface being short relative to the length of the rack.

A support surface of shorter length located between the ends of the rack produces considerable spring travel, so that zero-play engagement which is always sufficient is ensured between the pinion and the rack.

One advantageous improvement on the solution according to the invention is characterized by the support surface being located on the forward range of the rack, looking in the direction of travel.

By providing the support surface in the forward third of the rack, less spring action is ensured in the forward area, which becomes effective when short passengers, who as a rule also weigh less, assume this seat position, while a high degree of spring action is provided in the more frequently used area of the seat adjustment.

Another advantageous design of the solution according to the invention for an adjusting device for a vehicle seat with respect to a vehicle floor, connected with a rack, into which a pinion movable over the length of the rack engages, is characterized by the fact that the rack is designed to be sprung lengthwise and is supported by a supporting surface at either end on the vehicle floor, with the rack forming a curved spring path which passes through both support surfaces and whose midpoint is on the side of the rack opposite the pinion engaging the rack.

This "convexly" curved spring path creates the necessary requirements for especially easy manufacturability or mountability, since the support surfaces can be kept particularly small so that longer spring travel is provided as well.

One advantageous embodiment of the solution according to the invention is characterized by the fact that the rack consists of two sprung racks mounted parallel to one another and a central unsprung rack located between the sprung racks, which are connected together in the area of the support surface (of which there is at least one), with the sprung racks preferably being guided outside the (at least one) support surface on the central, unsprung rack in at least one and preferably two slots.

This design of the solution according to the invention makes it possible, with a small support surface and hence a greater spring action, to have an extremely stable arrangement in which firstly constant engagement of the pinion with the rack is ensured and secondly sufficient connecting points for high stability and hence optimum crash behavior are provided.

The support surface can be located partially between the ends of the rack and the two sprung racks staggered with respect to one another. Consequently, even without spring travel of the two racks, the pinion is sprung since the two teeth to the right and left of the pinion tooth which is engaged at this point are already being sprung once more.

Another advantageous embodiment of the solution according to the invention is characterized by the fact that the support surfaces of the two sprung racks are located at opposite ends of the rack and are connected in the area of the respective support surface with the middle unsprung rack, and by the fact that two slot guides are provided between the ends of the rack between the two sprung racks and the middle unsprung rack.

In this embodiment of the solution according to the invention, large support surfaces and hence improved crash behavior of the two parallel sprung racks are ensured, which are likewise guided in slots on a central unsprung rack. The staggered arrangement of the support surfaces ensures that in the operating area which is used more frequently, in other words in the middle position of the vehicle seat, double engagement of the pinion is provided once more, with both parallel sprung racks exhibiting spring action in this area.

One advantageous embodiment of a window lifter with a window lifter segmental arm articulated pivotably in a window lifter base plate and with a pinion engaging the segmental arm is characterized by the fact that a pin, permanently connected with the window lifter base plate, engages a recess in the window lifter segmental arm which has a rib which slides on the pin under spring tension when the window lifter segmental arm performs a pivoting movement.

In this design of the solution according to the invention for an electric window lifter, constant engagement of the pinion in the toothed segment of the window lifter segmental arm is likewise ensured, so that the play between the two drive elements is reduced.

This device is characterized by a limited space requirement for maintaining a small amount of play, easy assembly, and limited installation height/depth. Even when heavy window panes are used, such as window panes made of bullet-proof glass, the constant engagement of the pinion in the teeth of the segmental arm prevents a chattering effect, which as a result of the vibration and the insufficient engagement of the pinion in the teeth, leads to premature wear and hence a limited lifetime for the window lifter.

Advantageous improvements on the invention are characterized in the subclaims or are described in greater detail below together with the description of the preferred embodiment of the invention, with reference to the figures.

Figure 4:
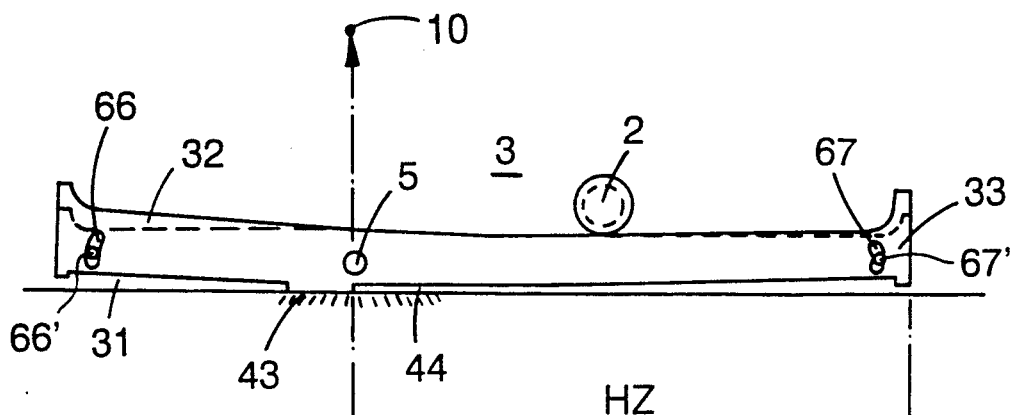
FIG. 4 is a side view of an adjusting device with centrally staggered support surfaces of the parallel sprung racks.
Figure 5:
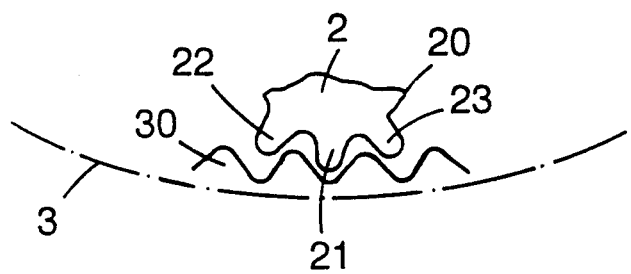
Figure 6:
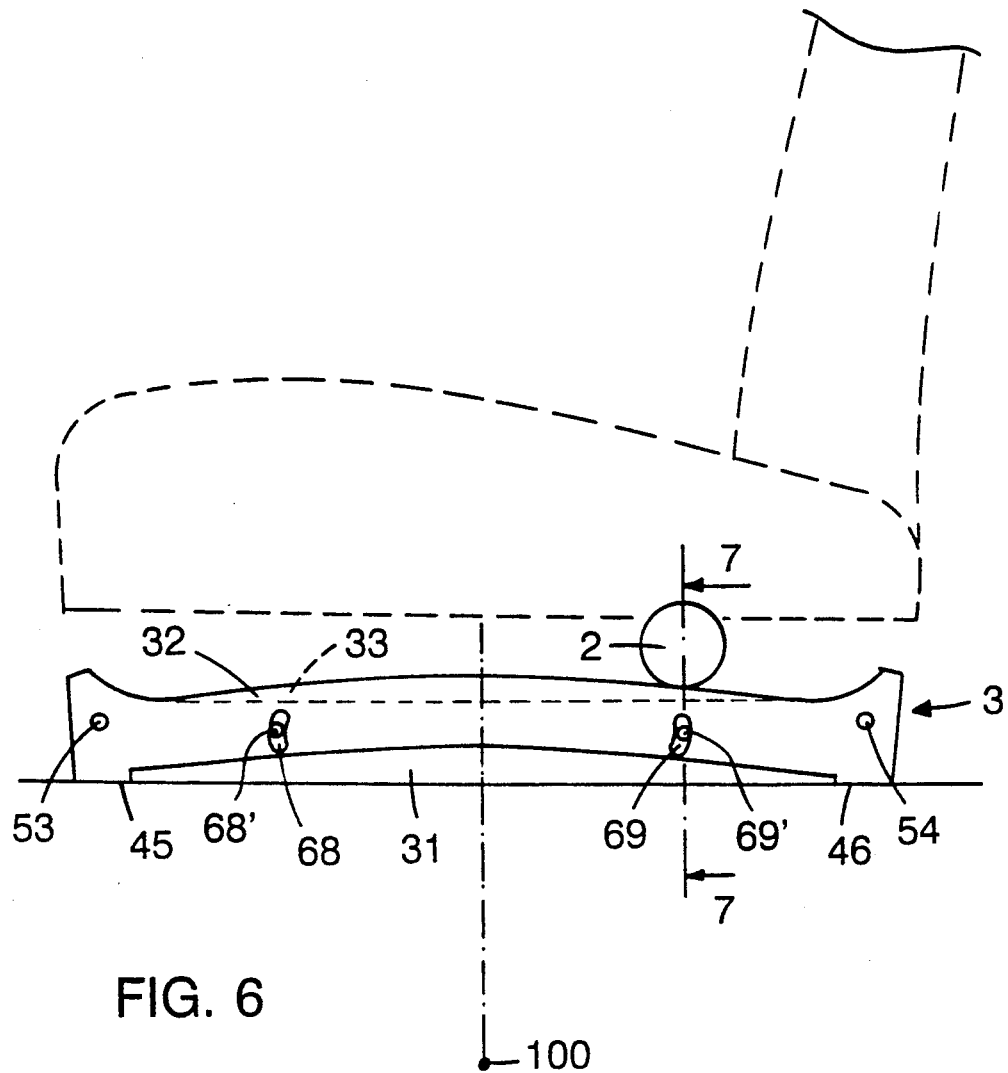
Figure 7:
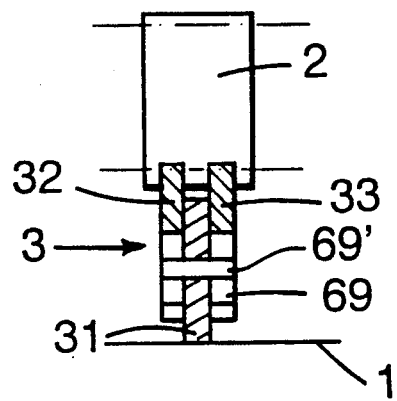
Figure 8:
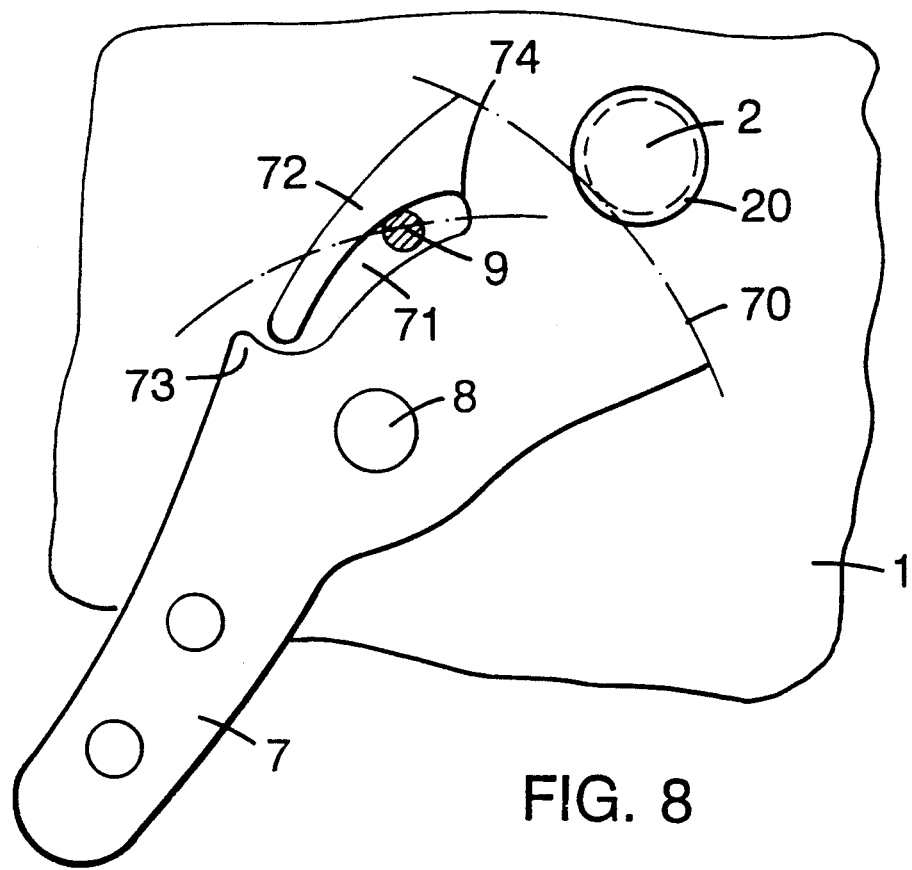

FIG. 5 an enlarged view showing the engagement of the pinion in the rack teeth in a device according to FIG. 4;

FIG. 6 is a seat adjustment (a seat is indicated in dashed line) with convexly curved rack and support surfaces located at the ends;

FIG. 7 is a section through the device in FIG. 6 along line 7—7, through the slot and guide pin and FIG. 8 is a segment of an articulated arm window lifter with a sprung window lifter segmental arm.

Figure 1:
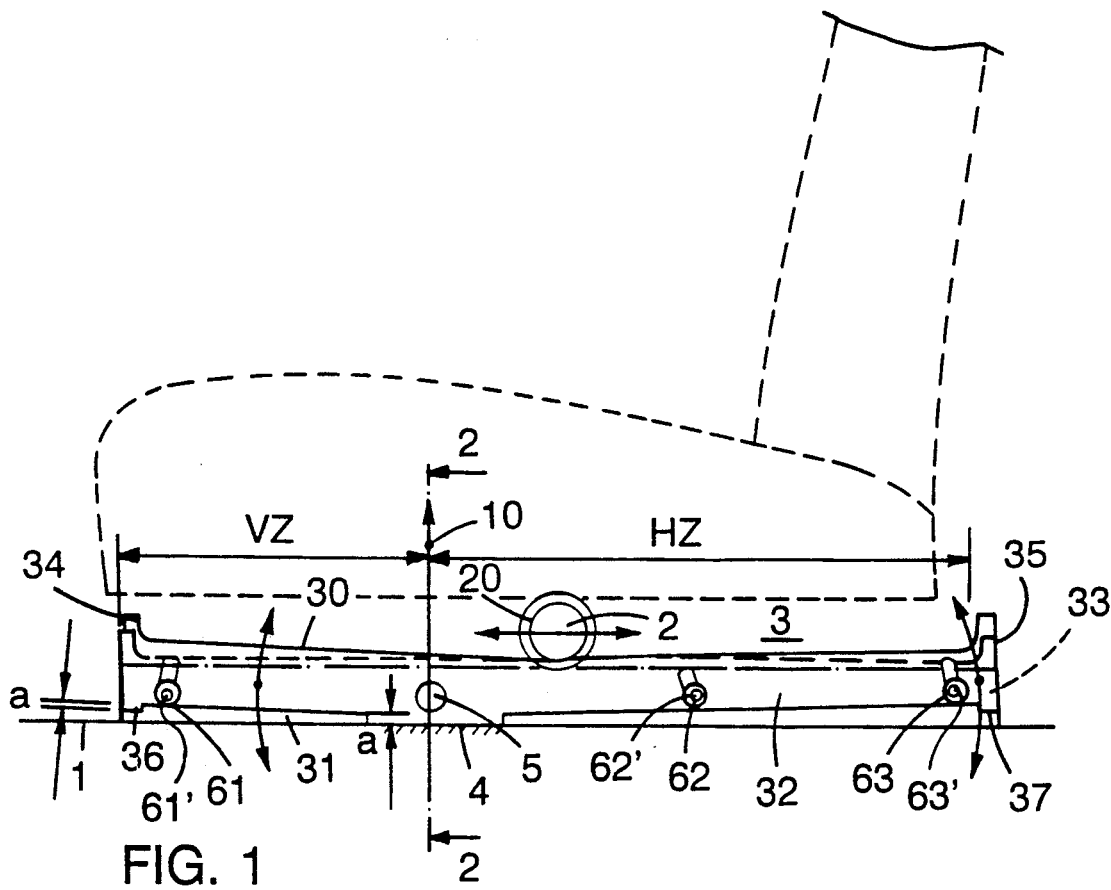
FIG. 1 is a side view of an adjusting device for a motor vehicle seat (indicated in dashed line) and a rack composed of two parallel sprung racks and a central unsprung rack, and a pinion engaging the teeth of the racks.

FIG. 1 is a schematic side view of a seat adjustment device for a vehicle seat with a rack 3 which is located lengthwise in the vehicle and is usually connected with the lower rail of the seat adjustment device which is fastened to the vehicle floor. A pinion 2 which is movable lengthwise on rack 3 engages the teeth 30 provided on the upper edge of rack 3 by means of its teeth 20, with pinion 2 being connected to an electric motor in a seat adjustment device powered by an electric motor.

Rack 3 has an end stop 34, 35 at its front and rear ends, said stops limiting the movement of pinion 2. Rack 3 is connected by a support surface 4 with vehicle floor 1 or the lower rail, not shown in greater detail, the length of said support surface being short relative to the length of rack 3. Support surface 4 is elevated by a distance a from the underside of rack 3, just like end stops 36 and 37 at the front and rear ends of rack 3.

Rack 3 is made sprung and describes a bent spring path whose midpoint 10 passes through the support surface 4 so that rack 3, with an eccentric support surface 4 as shown in FIG. 1, exhibits different spring travels at the front and rear ends. This results in a limited spring action in the forward range VZ, so that when the seat is in a forward position, less of a spring action is produced than when the seat is in a middle seat position which is at the rear looking in the direction of travel.

This different spring action ensures that in the seldom used forward seat adjustment range less spring action is produced than in the rear range HZ, which has a high spring action in the frequently used seat area. As a result, in this more frequently used area of the seat adjustment device, assurance is provided such that the pinion optimally engages the rack even when this position is constantly occupied. In this manner, the play between pinion teeth 20 and rack teeth 30 is kept at an absolute minimum even during prolonged use of a given seat position.

Figure 2:
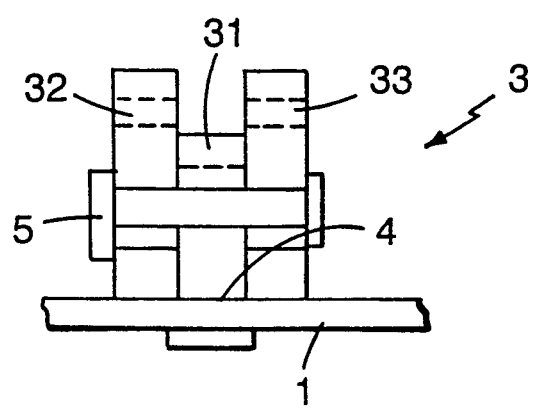
FIG. 2 is a section through the device in FIG. 1 along line 2—2.

As is shown in particular by the section in FIG. 2 through rack 3 along line 2—2 in FIG. 1, rack 3 consists of three individual racks 31, 32, and 33 with the two outer racks 32 and 33 being designed as parallel sprung racks which are guided on a central unsprung rack 31 by pins 61', 62' and 63' in respective slots 61, 62, and 63 shown in FIG. 1.

The three racks 31, 32, and 33 are riveted by a connecting pin 5 in the vicinity of support surface 4. The section shown in FIG. 2 is considerably enlarged, since the spring travel is usually only a few tenths of a millimeter, preferably 1/10 to 3/10 mm.

The special arrangement and composition of rack 3 from two parallel sprung racks 32, 33, and one central unsprung rack 31 ensures that pinion 2 will have its teeth constantly engaged in the teeth of rack 3, so that regardless of the position of the vehicle seat, minimum play is ensured between teeth 20 of pinion 2 and teeth 30 of rack 3.

The slot guidance for outer sprung racks 32 and 33 in central unsprung rack 31 increases the stability of the connecting device and provides additional protection against the seat mount tearing loose in the event of a crash.

Figure 3:
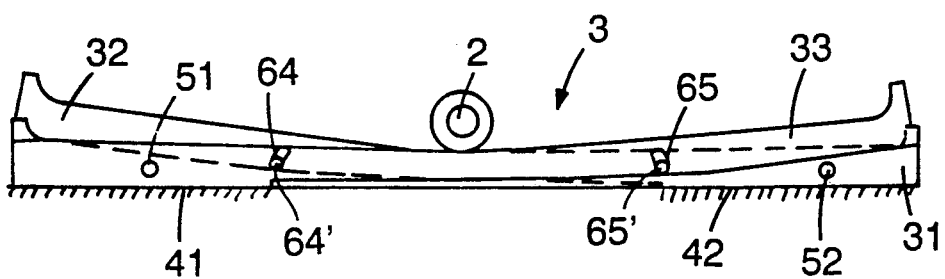
FIG. 3 is a side view of a seat adjustment device with support surfaces for the parallel sprung racks which are staggered and mounted at the ends.

FIG. 3 shows a variation on a seat adjustment device with a rack 3 in a side view in which, in contrast to sprung rack 3 shown in FIG. 1, large support surfaces are provided on the two parallel sprung racks 32 and 33 shown in FIG. 2, with the two sprung racks 32 and 33 in turn being guided on a central unsprung rack 31 according to FIG. 2 by pins 64' and 65' in respective slots 64 and 65.

Support surfaces 41 and 42 of the two parallel sprung racks 32 and 33 are mounted staggered with respect to one another, with support surface 41 of one sprung rack 33 being located at the forward end of rack 3 while support surface 42 of the other sprung rack 32 is located on the rear end of rack 3 and is riveted there to the central unsprung rack by a connecting pin 51 or 52.

This embodiment with a large support surface offers improved crash behavior and simultaneously ensures that pinion 2 is sprung in all positions, with the spring action being provided in the forward area by one sprung rack 32 and in the rear area by the other sprung rack 33.

In the operating position that is frequently employed, namely in the middle position of the vehicle seat, double engagement of pinion 2 in the teeth of rack 3 is provided, with the two parallel sprung racks 32 and 33 exerting a spring action in this area.

The diagram in FIG. 3 shows the spring action in an exaggerated view to make clear the functional mechanism of the connecting device. In reality, the spring travels at the ends amount to only a few tenths of a millimeter each.

FIG. 4 shows another alternative embodiment of the connecting device in which support surfaces 43 and 44 of the two parallel sprung racks 32 and 33 shown in FIG. 2 are mounted staggered around riveting or connecting point 5 with the central unsprung rack 31 according to FIG. 2. Support surface 43 for the left-hand sprung rack 32 is located in front of rivet point 5 while support surface 44 for the right-hand sprung rack 33 is provided behind rivet point 5, looking in the direction of travel.

In this embodiment, the two parallel sprung racks 32 and 33 are guided by pins 66' and 67' slots 66 and 67 in respective the ends of rack 3 in central unsprung rack 31.

Analogously to the embodiment shown in FIG. 1, support surfaces 43 and 44 are provided in the forward range of rack 3 so that different spring actions are obtained in the front and rear areas of rack 3. In rear area HZ of rack 3, even without spring travel of the two sprung racks 32 and 33, sufficient springing is provided for pinion 2 since, according to FIG. 5, both teeth 22 and 23 to the right and left of tooth 21 of pinion 2 which engages at this point are already sprung once again.

FIG. 5 makes clear in an enlarged view the engagement of teeth 20 of pinion 2 in the teeth 30 of rack 3, with the curved spring path of rack 3 being shown enlarged around midpoint 10 according to FIG. 4.

The embodiment shown in FIG. 6 shows in a side view a seat adjusting device for a vehicle seat indicated by dashed lines with a rack 3 and a pinion 2 with a convexly curved spring path of rack 3.

In this embodiment, midpoint 100 of the curved spring path of rack 3 is on the other side, in other words below vehicle floor 1 and hence on the side opposite pinion 2.

The two outer sprung racks 32 and 33 are riveted to central unsprung rack 31 in the vicinity of support surfaces 45 and 46. The small support surfaces 45 and 46 produce a longer spring travel for the two parallel sprung racks 32 and 33 which ensures ease of manufacture and/or assembly, since rivet points 53 and 54 according to FIG. 7, which shows a section along line 7—7 in FIG. 6, pass through all three racks 31, 32, and 33. The racks are guided by pins 68' and 69' in respective slots 68 and 69.

The slot connection of the two outer sprung racks 32 and 33 with central unsprung rack 31 forms an additional anchor in the event of a crash, with four anchoring points generally sufficing to keep rack 3 from being torn from its mount.

The diagram in FIG. 6 also shows in an exaggerated view the curved spring travel of rack 3.

FIG. 8 shows another embodiment of the solution according to the invention with reference to a section through an electric window lifter with a pinion 2 and a window lifter segmental arm 7 mounted pivotably on a window lifter base plate 1.

Window lifter segmental arm 7 has a toothed segment 70 with which teeth 20 of pinion 2 engage, with a rotation of pinion 2 causing pivoting of window lifter segmental arm 7 in the opposite direction, resulting in the window pane being either raised or lowered.

A pin 9, permanently connected with window lifter base plate 1 engages a recess 71 of window lifter segmental arm 7 which is mounted on pivot point 8 on the window lifter base plate. Recess 71 is delimited by window lifter segmental arm 7 on the one hand and by a sprung rib on the other hand, and in the lengthwise direction by stop edges 73 and 74.

During a rotation of pinion 2 in one or the other rotational direction, window lifter segmental arm 7 is constantly supported by pin 9 on sprung rib 72, with the engagement path of pin 9 into recess 71 being indicated by dot-dashed curved path C.

Consequently, window lifter segmental arm 7 is constantly driven by pin 9 against pinion 2 so that no further play occurs between teeth 20 on pinion 2 and segment teeth 70 of window lifter segmental arm 7. Stop edges 73 and 74 thereby delimit the path of movement of window lifter segmental arm 7 so that a firm engagement of both teeth 20 and 70 is ensured on the entire path of movement of the window lifter segmental arm.

In this manner, the constant engagement of both teeth reduces wear and chatter in the case of heavy window panes with a leading or lagging movement of window lifter segmental arm 7 relative to the rotational speed of pinion 2.

At the same time, very simple installation in a very short space of time is ensured, with no additional mounting aids being required. Braking devices to brake the window lifter segmental arm in the case of heavy window panes are also dispensable since the guaranteed constant engagement of both teeth 20 and 70 ensures that the pivoting movement of window lifter segmental arm 7 is governed exclusively by the angle of rotation of pinion 2.

As the embodiments described above show, the connecting device according to the invention consists of a few individual parts so that firstly manufacture is made less expensive and secondly low weight is ensured. By reducing the play between teeth 20 of pinion 2 and teeth 30 of rack 3 and/or segment teeth 70, low wear is ensured and thereby simultaneously the lifetime of the connection between the two drive elements is distinctly increased.

Space requirements are not increased in contrast to conventional devices which must take the above disadvantages into account. Assembly is very simple since no additional mounting aids are required to press down a drive element which is totally sprung from a base. Simplification of installation also definitely reduces assembly time and hence assembly cost.

The invention is not limited in its embodiments to the preferred embodiment given above. Rather, a plurality of variations are possible which make use of the solution shown even in basically very different forms.

I claim:

1. Device for adjusting a position of a vehicle seat relative to a vehicle floor, comprising a first drive element and a second drive element, said first drive element and said second drive element having respective engaging flanks opposite one another, said engaging flanks being rollable positively on one another, said first drive element being connected by two support surfaces with a base on the vehicle floor and describing a convexly curved spring path around a midpoint located below said two support surfaces on a side opposite said second drive element, the vehicle set being mounted upon the second drive element.

2. Device according to claim 1 wherein said first drive element comprises a rack and said second drive element comprises a pinion, said pinion engaging said rack and being movable over a length of said rack, said rack being sprung lengthwise and supported by two support surfaces at ends of said rack on the vehicle floor, the vehicle seat being mounted on said pinion, and said rack forming a convexly curved spring path passing through both said support surfaces and having a midpoint located on a side of said rack opposite a side on which said pinion is in engagement with said rack.

3. A device for adjusting a position of a vehicle seat relative to a vehicle floor, comprising a first drive element and a second drive element, said first drive element and said second drive element having respective engaging flanks opposite one another, said engaging flanks being rollable positively on one another, with said first drive element being connected by at least one support surface or by a pivot element to a base, and said first drive element forming a uniformly curved spring path adapted to direct the engaging flank of said first drive element against the engaging flank of said second drive element;

said first drive element comprising a rack and said second drive element comprising a pinion, said pinion being in engagement with said rack and movable over the length of the rack, said rack being sprung lengthwise, and said rack being supported on the vehicle floor by a support surface smaller than the length of said rack, said rack describing a concavely curved spring path passing through said support surface and having a midpoint on a side of said rack on which said pinion is in engagement with said rack.

4. Device according to claim 3, wherein said support surface is located on a forward range of said rack relative to a direction of travel of said pinion.

5. Device according to claim 3, 4 or 2, wherein said rack comprises two sprung racks arranged parallel to one another, and a central unsprung rack located between said two sprung racks, said two sprung racks and said central unsprung rack being connected together in the vicinity of said support surface.

6. Device according to claim 5, wherein said two sprung racks are guided outside said support surface on said central unsprung rack in at least one slot guide.

7. Device according to claim 6, wherein said sprung racks are guided in two slot guides.

8. Device according to claim 6, wherein said support surface is located between said ends of said rack, and said at least one slot guide is provided at said ends of said rack.

9. Device according to claim 8, wherein each said sprung rack is connected to said base by a support surface, the respective said support surfaces being arranged staggered with respect to one another.

10. Device according to claim 9, wherein the respective said support surfaces are disposed staggered on opposite sides of a rack connection.

11. Device according to claim 10, wherein the respective said support surfaces of said sprung racks are located at opposite ends of said rack and the respective said support surfaces are connected in the vicinity of the respective support surfaces with the central unsprung rack and two slot guides are provided between ends of said rack between said two sprung racks and said central unsprung rack.

12. An adjusting device for a vehicle comprising a first drive element and a second drive element, said first drive element and said second drive element having respective engaging flanks opposite one another, said engaging flanks being rollable positively on one another, with said first drive element being connected by at least one support surface or by a pivot element to a base, and said first drive element forming a uniformly curved spring path adapted to direct the engaging flank of said first drive element against the engaging flank of said second drive element;

said first drive element comprising a window lifter segmental arm articulated pivotably on a window lifter base plate, said second drive element comprising a pinion engaging said segmental arm, and said device further comprising a pin permanently mounted in the window lifter base plate and engaging a recess in said window lifter segmental arm, said recess having a sprung rib disposed to slide under spring tension along said pin during a pivoting movement of said window lifter segmental arm.

13. Device according to claim 12, wherein said sprung rib is disposed essentially perpendicular to an engagement flank of said window lifter segmental arm.

14. Device according to claim 12 or 13, wherein said recess of said window lifter segmental arm has stop edges.

15. Device according to claim 7, wherein said support surface is located between said ends of said rack, and said slot guides are provided at said ends of said rack.

* * * * *